W. E. LOWELL.
BISCUIT STRIPPING MECHANISM.
APPLICATION FILED FEB. 23, 1918.
1,279,563.
Patented Sept. 24, 1918.
2 SHEETS—SHEET 2.
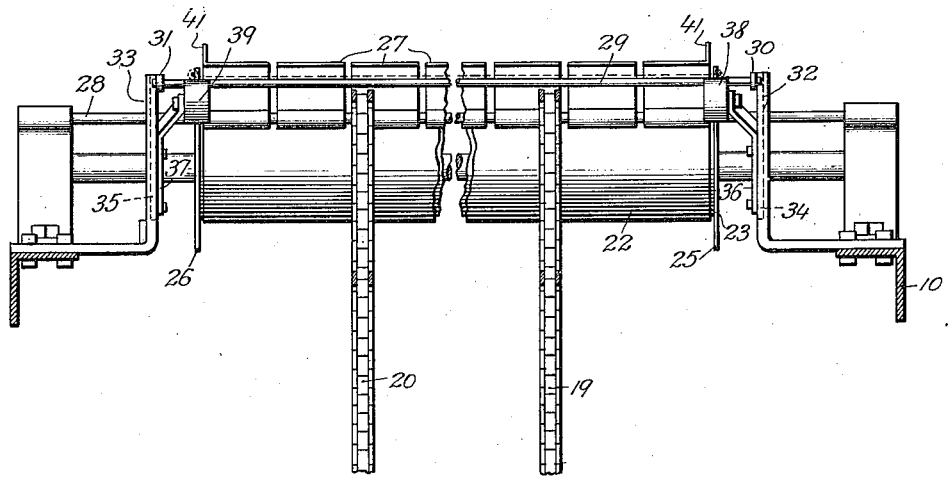
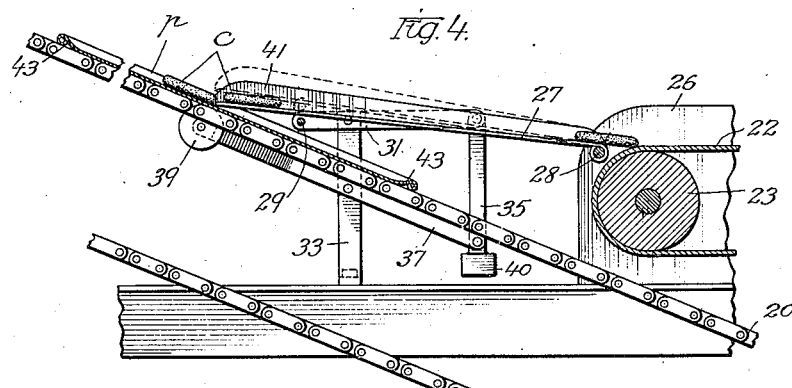
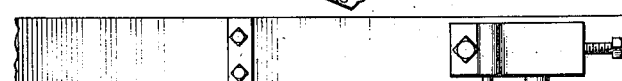
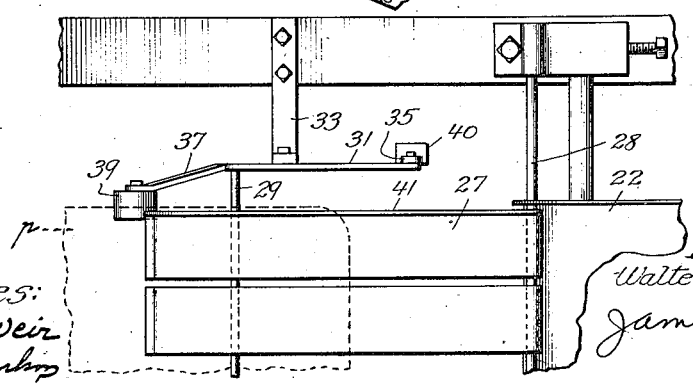
Witnesses:
Robert H. Weir
Arthur W. Carhrp
Inventor
Walter E Lowell
James R. Offer
Atty

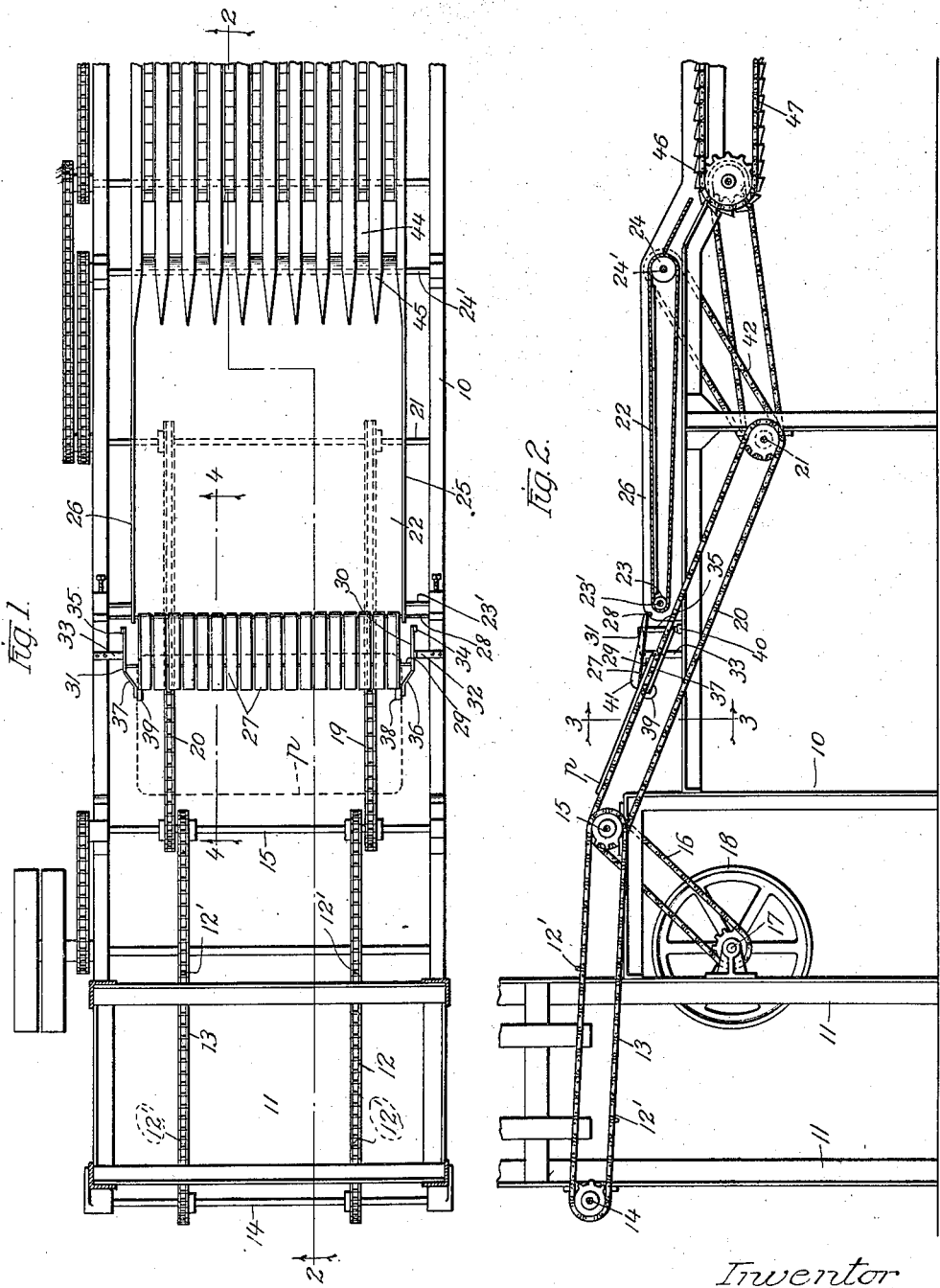

UNITED STATES PATENT OFFICE.

WALTER E. LOWELL, OF NEW YORK, N. Y., ASSIGNOR TO NATIONAL BISCUIT COMPANY, OF NEW YORK, N. Y., A CORPORATION OF NEW JERSEY.

BISCUIT-STRIPPING MECHANISM.

1,279,563.　　　　Specification of Letters Patent.　　Patented Sept. 24, 1918.

Original application filed June 21, 1916, Serial No. 104,855. Divided and this application filed February 23, 1918. Serial No. 218,842.

*To all whom it may concern:*

Be it known that I, WALTER E. LOWELL, a citizen of the United States, and a resident of New York, in the county of New York and State of New York, has invented certain new and useful Improvements in Biscuit-Stripping Mechanism, of which the following is a specification.

My invention relates to machines for handling biscuits or other baked products, and particularly to improved mechanism for detaching or stripping biscuits from pans during their travel through the machine. This application is a divisional application resulting from the request by the Patent Office, to divide in my pending application Ser. No. 104,855, filed June 21, 1916.

My improved biscuit stripping mechanism is clearly shown on the accompanying drawings in which—

Figure 1, is a plan view,

Fig. 2, is a sectional view on plane 2—2 Fig. 1,

Fig. 3, is an enlarged sectional view on plane 3—3 Fig. 2,

Fig. 4, is an enlarged sectional view on plane 4—4 Fig. 1, and

Fig. 5, is a plan view of one side of the stripping mechanism.

The supporting structure for the machine is in the form of a long table 10. At one end of the table is a vertical framework 11 forming a conveyer passageway for pans $p$ containing products to be packaged. Conveyer belts 12 and 13 extend through the bottom of the conveyer passageway for receiving the pans, these belts being provided with pan abutment fingers 12′ and being driven by sprocket wheels on shafts 14 and 15, one of the shafts being driven by a chain belt 16 from a main shaft 17 which carries the belt pulley 18. The pans $p$ are shifted from the conveyer belts 12 and 13 to the belts 19 and 20 which engage sprocket wheels on the shafts 15 and 21, the belts 19 and 20 extending diagonally.

Before the pans reach the lower ends of the inclined belts the biscuits, cakes or other products are removed therefrom to a conveyer belt 22 which passes around the pulleys 23 and 24 on shafts 23′ and 24′, the belt 22 extending almost full width of the machine between side plates 25 and 26 supported on the table.

The mechanism for stripping and removing the biscuits or other products from the pans is clearly shown in Figs. 3, 4 and 5. A plurality of scraper blades 27 are arranged in a transverse row and are pivoted at their inner ends on the rod 28 extending between the front ends of the side plates 25 and 26 between which the belt 22 travels. Normally the blades rest near their front ends on a rod 29 which extends between the ends of levers 30 and 31 pivoted at an intermediate point at the upper ends of brackets 32 and 33 which rise from the table top, as clearly indicated. The inner ends of the levers are connected by links 34 and 35 with the inner ends of weight levers 36 and 37, these levers being pivoted at an intermediate point to the brackets 32 and 33 and at their outer ends carrying the rollers 38 and 39. Provision is made, as by means of weights 40, for normally over-balancing the lever mechanism in order to cause the rod 29 to be normally raised sufficiently to hold the outer ends of the scrapers 27 above the path of an approaching pan $p$ and to hold the rollers 38 and 39 in the path of the oncoming pans. With this arrangement, as a pan $p$ approaches its advance edge will first encounter the rollers 38 and 39 to effect swing of the levers 36 and 37, thereby raising the links 34 and 35 and causing swing of the levers 30 and 31 to lower the rod 29 away from the scrapers to permit the scrapers to drop into the pan immediately inside the front edge of the pan. The biscuits, cakes, or other products $c$ are then scraped from the pan and travel down the scrapers onto the belt 22. The outside scrapers preferably have the vertical guide flanges 41 for preventing escape of biscuits as they travel over the scrapers. The conveyer belt 22 may be driven in any suitable manner. As shown, a chain 42 engages sprocket wheels on shaft 21 and the pulley shaft 24′.

The front and rear sides 43 of the pans do not rise abruptly but incline gradually in order to present smooth gradually inclines for receiving the ends of the scraper fingers and for permitting such ends to travel readily over the trailing end wall or side of the pans after the cakes or biscuits have been stripped therefrom. As soon as a pan leaves the rollers 38 and 39, the levers 36 and 37 will be swung on account of the weights 40 and rod 29 will be raised to hold the ends of the fingers up away from the conveyer chain 20. The rollers are then engaged by the advancing end of the next pan to cause the fingers to be brought against the pan bottom.

The biscuits received on the conveyer belt 22 are carried by the belt into and along grooves 44 between the guide ridges 45, and are received on the blocks 46 of the conveyer chain 47 by which they are delivered to stacking and packing mechanism which mechanism forms no part of this present invention.

My improved stripping mechanism is very simple and has proven to be very efficient. I do not of course, desire to be limited to the exact construction, arrangement and operation shown and described as changes and modifications, can no doubt be made which will still come within the scope of the invention.

I claim as follows—

1. In mechanism of the character described, the combination of a conveyer for biscuit supporting pans, a conveyer for biscuits extending from said pan conveyer, a scraper blade for delivering biscuits from the pans to the biscuit conveyer, means normally holding the advance end of said blade above the path of pans on the pan conveyer, means controlled by traveling pans to bring the blade edge into and against the pan to scrape the biscuits therefrom and to deliver them to the biscuit conveyer.

2. In mechanism of the class described, the combination of a conveyer for biscuit supporting pans, a biscuit carrier, scraper blades extending between said conveyer and carrier, means normally holding the receiving ends of said blades above the path of pans on said conveyer, and means engaged by the pans and operated to bring the blade ends against the pans whereby biscuits on said pans are scraped therefrom by the blades and delivered by the blades to the carrier.

3. In mechanism of the character described, the combination of a continuously traveling conveyer for biscuit containing pans, a continuously traveling carrier for biscuits, scraper blades hinged along the receiving end of the carrier and projecting toward the pan conveyer, means normally holding the ends of the blades above the path of pans on the conveyer, and means controlled by the pans for permitting the blades to come into scraping engagement with the pans whereby to scrape the biscuits therefrom and to deliver them to the carrier.

4. In mechanism of the character described, the combination of a conveyer for biscuit supporting pans, a conveyer for biscuits extending from said pan conveyer, a blade hinged at its rear end to the receiving end of said biscuit conveyer with its front end adjacent the pan conveyer, means normally holding said blade upwardly with its front end a distance above the pan conveyer to permit the front ends of pans to pass thereunder, and lever mechanism engaged by the pans to actuate said blade holding means to cause said blades to drop with their front ends against the bottom of the pans.

5. In mechanism of the character described, the combination of a conveyer for biscuit supporting pans, a biscuit conveyer extending from said pan conveyer, a scraper blade hinged at its rear end adjacent the receiving end of the biscuit conveyer, a bar below the blade, a lever supporting said bar, means for swinging said lever to cause the bar to hold the receiving end of the blade a distance above the pan conveyer to permit the front end of a pan to pass thereunder, and actuating mechanism connected with said lever and engaged by an oncoming pan to swing said lever to lower said bar whereby to permit the blade to engage at its receiving end with the pan bottom.

In witness whereof I hereunto subscribe my name this 18th day of February, A. D., 1918.

WALTER E. LOWELL.